July 9, 1929.  R. O. PICKIN  1,720,401
ROLLER DRILL
Filed June 18, 1927

INVENTOR
Rowland O. Pickin

Patented July 9, 1929.

1,720,401

UNITED STATES PATENT OFFICE.

ROWLAND O. PICKIN, OF LOS ANGELES, CALIFORNIA.

ROLLER DRILL.

Application filed June 18, 1927. Serial No. 199,656.

My invention relates to improvements in roller drills used for the purpose of drilling holes in the earth, such as oil, gas and water wells by the rotary method of drilling.

The principal object of the invention is to provide a roller drill with improved rotatable cutting means.

Another object of the invention is to provide a roller drill with an improved means for locking the rotatable cutter upon its bearing.

Another object of the invention is to provide a roller drill with a bearing that will give a firmer support to a pin upon which the bushing and rotatable cutter are mounted.

Another object of the invention is to provide a roller drill with a pair of rotatable conical cutters having cutting teeth spirally spaced by deep grooves which entirely separate the teeth and the cuttings of each tooth and allow the teeth on each cutter to become exposed and dig into a soft formation upon a continually changing path of travel.

Another object of the invention is to provide a roller drill having a rotatable conical shaped cutter and bearing, with means whereby the grit and cuttings are prevented from entering the bearing and whereby the lubricant is retained in the bearing for a longer period, thus allowing the cutters to remain in the hole for a longer period with the certainty of their being lubricated.

Other objects and advantages of the invention will be apparent as it is better understood, from the following description when considered in conjunction with the accompanying drawing illustrating a preferred embodiment thereof.

On the drawing.

Similar numerals refer to similar parts throughout the two views.

Figure 1:
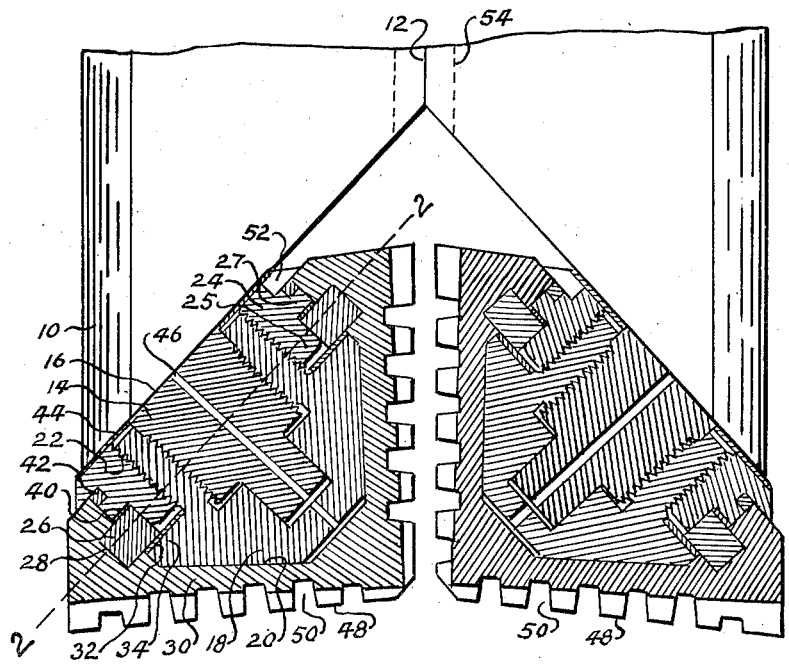
Fig. 1 shows a part elevation of the roller drill, having the lower part in section showing the internal construction.

The shank of the roller drill is indicated by the numeral 10, Fig. 1. This shank is split along the line 12, Fig. 1.

Since the two halves shown are identical and work together as a pair and perform in the same manner with the exception of the cutting teeth, only one will be described with the above exception.

The inclined pin 14 projects downwards at a right angle to the face 16 of the shank 10, Fig. 1, the pin 14 is threaded for the purpose of attaching the internally threaded bushing 18. The bushing 18 has a bearing face 20 upon its lower end, and has threads 22 upon its exterior upper end, these threads being for the purpose of accommodating the clamping member or ring 24, which is similarly threaded and screwed down upon the locking members or lugs 26. These lugs encircle the bushing 18 and the lower part of the clamping ring 24, and project outwardly into the angular recessed groove 28 which encircles the inside of the conical shaped cutter 30, the outer or projecting portion of the lugs form a sliding fit in the cutter groove. The cutter 30 surrounds the end of the bushing 18.

Figure 2:
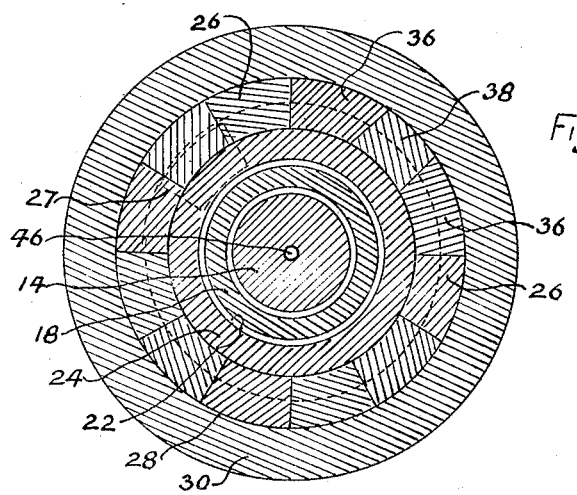
Fig. 2 is a section taken on the line 2—2 Fig. 1.

In assembling the device, the bushing 18 is placed inside the cutter 30, the copper washer 32 is then placed upon the shoulder 34, Fig. 1. The lugs 26 are first inserted in the manner shown by the dotted lines 27, then the two lugs 36 and last the lug 38 is inserted, this lug has parallel or wedge-shaped ends. The lugs are inserted through the space taken up by the clamping ring 24, the lugs are all pushed into the position shown in Fig. 2.

The spacing or adjusting washer 40 is for the purpose of preventing the base of the cutter from binding upon the base of the ring 24, this is placed upon the lugs, the clamping ring 24 carrying the felt oil retaining ring 42 is next screwed down tightly upon the washer 40, the spacing portion 25 and the shoulder 27 hold the lugs firmly in the position shown in Fig. 1.

The assembly is then screwed upon the pin 14 by a spanner inserted in the slot 52, and abuts against the copper washer 44, placed upon the face 16 of the shank 10. The clamping member 24 forms the seat of the assembly.

After the two halves of the shank are fastened together and as the bit rotates in operation the cutter 30 slides upon its internal bearing, which consists of the bushing 18, the lugs 26, and the clamping ring 24, the friction then tends to tighten up the joints owing to the arrangement of the threads, and the lubricant running down the duct 46 is retained between the bearings by the felt ring 42, this insures ample lubrication and at the same time prevents the grit of the cuttings from entering the bearing.

The rows of teeth 48 are separated by deep wide grooves 50, Fig. 1. These grooves are cut so as to entirely separate the teeth spirally around the cone-shaped cutters.

By this arrangement the teeth do not track, but are brought into contact with the whole surface of the hole as the two cutters rotate in operation. Flushing out water is delivered between the two cutters from the water channel 54 to wash away the cuttings.

When worn the assembly is removed by separating the two halves of the shank and by inserting a spanner wrench in the slots 52, the threads tend to tighten up the assembly joints which more easily releases the assembly from the face 16. The bushing 18 is not seated on the face, as the wider base of the clamping ring 24 gives a wider and more secure support if thus arranged, this prevents the pin 14 from being sprung when great weight is applied to the apex of the cutter in drilling.

I claim:

1. A roller drill, provided with a shank having a threaded pin projecting at a right angle from an inclined face of said shank, and having a bushing threadedly mounted upon said pin, and a cutter rotatably mounted upon said bushing and retained thereon by means of detachable lugs encircling said bushing, said lugs being secured in place upon said bushing by means of a ring connected to said bushing.

2. A roller drill, provided with a shank, having a threaded pin projecting at a right angle from an inclined face of said shank and having a bushing threadedly mounted upon said pin, and a cutter rotatably mounted upon said bushing and retained thereon, by a locking means inserted into a grooved recess encircling the inside of said cutter, said locking means being inserted into said grooved recess through an annular opening between said cutter and said bushing, and being retained therein by a spacing ring attached to said bushing.

3. In a roller drill, a bushing shaft, a bushing mounted thereon and a cutter rotatably mounted on said bushing, a recess encircling the inside of said cutter, lugs which slide upon the faces of said recess, and a spacing ring between said bushing and said lugs for retaining said lugs in said recess.

4. In a roller drill, a threaded pin, a bushing mounted thereon, a cutter rotatably mounted upon said bushing, and retained thereon by lugs, the outer portion of which projects into a recess formed around the inside of said cutter, and having an inner portion which is clamped down upon a shoulder of the bushing, by a ring which is connected to said bushing.

5. In a roller drill, a threaded pin, a bushing mounted thereon, a cutter rotatably mounted upon said bushing, enclosing the end of said bushing, said cutter being recessed to provide a runway for stationary lugs which project into said recess, said lugs being inserted through an annular opening between said cutter and said bushing, said annular opening being closed by a ring threadedly connected to said bushing, said ring performing the function of holding the lugs in said recess and of holding the lugs stationary upon said bushing.

6. In a roller drill, a threaded pin, a bushing mounted thereon, a cutter rotatably mounted upon said bushing, and retained thereon by lugs projecting into said cutter, said lugs being retained in position by an annular ring threadedly connected to said bushing, said ring forming the base for the bushing and overlapping the inside bearing face of the cutter, for the purpose of preventing the cutter wearing upon the shank.

7. In a roller drill, a pin, a bushing secured thereon, a cutter surrounding the end of the bushing, and means for retaining said cutter upon said bushing, said means consisting of lugs projecting into said cutter, and a clamping ring for clamping said lugs tightly upon said bushing.

8. In a roller drill, a pin, a bushing threadedly secured thereon, a cutter surrounding the end of said bushing, means for retaining said cutter upon said bushing, said means consisting of lugs projecting into a recess in said cutter, said lugs being clamped in position upon the bushing by an annular ring surounding the upper portion of said bushing, said ring having provision for carrying a lubricant retaining packing ring between said clamping ring and said cutter.

9. In a roller drill, an internally threaded bushing for mounting upon a drill head, a cutter rotatably mounted upon said bushing and surrounding the end thereof, and a locking bearing for locking said cutter rotatably upon said bushing, and a ring attached to said bushing which retains said locking bearing in position on said bushing, said ring having a part projecting above said cutter and cushioned against the drill head, the said ring being provided with a slot for the accommodation of a spanner for tightening or releasing said ring against or from the said head.

10. In a roller drill, an internally threaded bushing for mounting upon a pin attached to the drill head, a cutter rotatably mounted upon said bushing and surrounding the end thereof, and locking lugs for locking said cutter upon said bushing, said locking lugs being located between said bushing and said cutter, said locking lugs being retained in position by a ring connected to the bushing, said ring projecting above said cutter and being cushioned against the head, said ring being provided with a slot for the accommodation of a spanner, for securing said ring onto or from said bushing.

11. In a roller drill, a bushing having detachable locking lugs projecting outwardly therefrom and retained in position by a ring connected to said bushing, and having a cutter rotatably mounted upon said bushing and surrounding the end of said bushing, said cutter having its inside bearing surface approximately similar to the outside bearing surface of the bushing with the lugs and ring mounted thereon.

12. In a roller drill, a cutter having means provided for rotatably locking upon a bushing and having its inside bearing surface approximately similar to the outside bearing surface of the bushing upon which it is rotatably locked, said bearing surface consisting of a bushing or main bearing portion, locking lugs projecting outwardly therefrom and a ring for retaining said lugs in locking position.

13. In a roller drill, an approximately frusto conical shaped cutter having its inside bearing surface of approximately similar contour to the outside bearing surface of the bearing assembly upon which it is rotatably locked, said bearing assembly consisting of a main bearing portion, locking lugs projecting outwardly therefrom, and a detachable clamping ring connected to said main bearing portion for retaining said lugs in locking position.

14. In a roller drill, an approximately frusto conical shaped cutter, having an inside bearing surface of approximately similar contour to the outside bearing surface of the bearing assembly upon which the said cutter is rotatably locked, the said cutter surrounding one end of the said bearing assembly, the said bearing assembly consisting of an internally threaded bushing for mounting upon a threaded pin attached to the drill head, the said bearing having detachable locking lugs projecting outwardly from the surface thereof, the said lugs being secured in position by a clamping ring threadedly attached to said bushing.

15. In a roller drill, an internally threaded bushing having detachable locking bearings mounted thereon and retained thereon by a bearing ring which retains said locking bearings upon said bushing, the said locking bearings projecting into a groove in a cutter rotatably mounted upon said bushing, for the purpose of rotatably locking the said cutter upon the said bushing.

16. In a roller drill, an internally threaded bushing, a cutter rotatably mounted upon said bushing and retained thereon by means of detachable lugs encircling said bushing and projecting into a groove in said cutter and being secured in place upon said bushing by means of a ring attached to said bushing.

17. In a roller drill, a cutter rotatably mounted upon an internally threaded bushing, and locked thereon by detachable lugs projecting into a groove in said cutter, said lugs encircling said bushing and being secured in place by an internally threaded ring mounted upon said bushing.

18. In a roller drill, an approximately frusto conical shaped cutter rotatably locked upon an internally threaded bushing by means of detachable locking bearings encircling said bushing, said locking bearings being retained in locking position by a ring encircling and threadedly connected to said bushing.

19. In a roller drill, the combination of a pair of approximately frusto conical cutters with spirally arranged teeth projecting from the face thereof, a pair of internally threaded bushings upon which the cutters are rotatably mounted, and a locking means consisting of lugs mounted upon each bushing and encircling each bushing and retained thereon by a clamping ring attached to each bushing, the said lugs projecting into a groove in the cutters in which they form a sliding fit.

20. In a roller drill, a cutter rotatably mounted upon a bearing and locked thereon by means of detachable lugs projecting outwardly from said bearing into a groove formed in the inside of said cutter in which they form a sliding fit, the said lugs being retained in locking position upon said bearing by an internally threaded ring which clamps the lugs in locking position, so that they remain stationary with the bearing, the said ring having its base overlapping a portion of the base of the cutter.

ROWLAND O. PICKIN.